Patented Nov. 19, 1940

2,222,450

UNITED STATES PATENT OFFICE 2,222,450

METHOD FOR MEASURING SHORT-WAVE RADIATIONS

Adolf Trost, Berlin-Steglitz, Germany, assignor to Gesellschaft zur Förderung Zerstörungsfreier Prüfverfahren e. V., Berlin-Dahlem, Germany Application July 20, 1938, Serial No. 220,407
In Germany November 20, 1937

2 Claims. (Cl. 250—83)

The invention relates to a method for measuring short wave rays such as X-rays, gamma rays and the like by means of a counter tube (Geiger-Müller counter) with vapour addition, especially for the purpose of testing materials without destroying them.

A Geiger-Müller counter is an electric discharge tube which comprises substantially a metal cylinder closed at its ends by tightly fitting insulating plugs and accommodating in its interior a metal wire extending to the outside and called the counter wire. The interior of the metal cylinder is brought to a low pressure, for example 50 mm. mercury column, by partial evacuation. The metal wire axially stretched in the interior of the tube forms an electrode of the counter tube, the metal cylinder forming the second electrode. If a high voltage is applied on the counter tube between the metal cylinder and the counter wire, every electron liberated in the interior of the tube by an impinging ray particle causes a discharge impulse by a resultant avalanche of ions, that is a large quantity of electricity (current impulse) flows for a short time in the counter tube circuit.

These current impulses can be rendered perceptible if a sensitive measuring instrument is connected up in the counter tube circuit, which instrument indicates the counter tube impulses by needle deflection. It must be seen that the voltage (operative voltage) applied on the counter tube is sufficiently high, because the magnitude of the counter tube impulses is strongly dependent upon the voltage applied on the counter tube.

Figure 2:
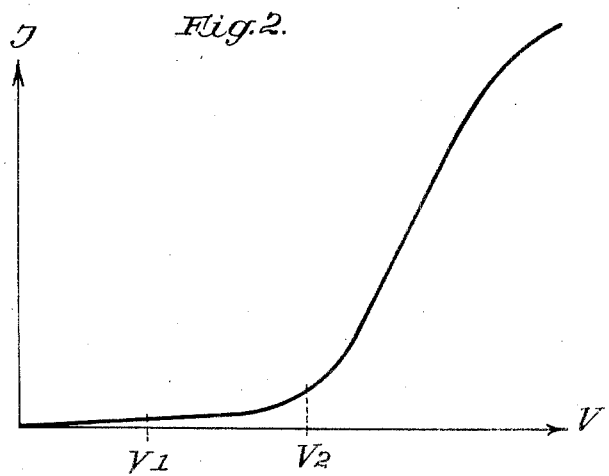

In Fig. 2 of the accompanying drawing this dependency of the magnitude of the counter tube impulse on the operative voltage of the counter tube is explained on hand of a graphic illustration. It has here to be imagined that on the abscissa towards the right in the direction of the arrow increasing values of the operative voltage V (voltage laid on the counter tube) are applied, but on the ordinate values of the counter tube impulse values J increasing in direction of the arrow, that is increasing in upward direction. The curve shown, which experts designate as so called "counter tube characteristic," shows the following: If the operative voltage (point of intersection of the abscissa and ordinate) is 0, laid on the counter tube, the value of the counter tube impulse is evidently also 0. If then the operative voltage is quite gradually increased, the value of the counter tube impulse increases only very little. This means, that small increasings of the operative voltage result in only slight increasings of the value of the counter tube impulse. A very sensitive indicating instrument in the circuit of a counter tube operated at such low voltage would show only very slight oscillations of the pointer. If then, (compare again the curve) the operative voltage is gradually further increased, a voltage point is finally attained, which is designated by $V_2$ in the Fig. 2, at which the value of the counter tube impulse increases quite suddenly by leaps. This means, that in direct proximity of this voltage point a great increase of the value of the counter tube impulse, i. e., an increase by leaps, now corresponds to a slight alteration of the operative voltage. The indicating instrument would then show quite suddenly very large oscillations of the pointer. This quite determined voltage point mentioned above is generally called by experts "threshold voltage" of the corresponding counter tube. This is, accurately expressed, the potential point of the greatest relative alteration of the counter-tube impulse value in dependency on the potential laid on the counter tube. This voltage point exists in any counter tube very accurately within a very narrow voltage range of about 1 to 2 volts. This "threshold voltage" is evidently not the same for all counters which may be imagined and of any desired size. It depends upon the size, the internal pressure and the filling of the tube, but has, as already stated, always an accurately predetermined value in each counter. Up to the present, the counter tubes were always operated with an operative voltage which was greater than the so called "threshold voltage." One operated therefore on that part of the curve (compare Fig. 2) which lies at the right of $V_2$, because in this manner rather large counter tube impulses and therefore large pointer oscillations on the indicating instrument were obtained. As will be hereinafter explained, counter tubes operated with such high voltage do, however, fail at such high impulse numbers, when very many impulses have to be counted.

A counter tube with "vapor addition" is a counter tube of the type described, in the interior of which a small quantity of a substance such as alcohol is introduced which is liquid under ordinary pressure and at normal temperature but is in the state of vapor in the interior of the counter tube which, as stated above is under low pressure. Such counter tubes with vapor addition have been developed because they present certain advantages over the counter tubes previously used. For the purpose of testing materials without destroying them such counter tubes have been used, for example, in the following manner: A beam of X-rays is projected on such a counter tube. The counter tube then indicates on a measuring instrument connected up in the counter tube circuit, for example an electrometer connected in parallel to the resistance in the counter tube circuit, a certain number of impulses proportional to the impinging ray intensity. If, for example, an iron plate to be tested is introduced in the ray path between the source of the rays and the counter tube, the counter tube evidently indicates a smaller number of impulses because the iron plate partly absorbs the rays. This smaller number of impulses must remain constant, provided the thickness of the plate remains the same, if several zones of this iron plate are brought into the ray path. If this is not the case, it can be assumed that there is a defect, for example, a blow-hole in the interior of the iron at the point of the iron plate where a higher number of counter tube impulses were recorded. This higher number of impulses is caused by the fact that at the point in question the weakening of the rays is less owing to the presence of a hollow space due to lack of iron mass.

The counter tubes (Geiger-Müller counters) with vapor addition hitherto used for this purpose failed when the radiation intensities to be measured were too great, that is when, for example, more than 1000 impulses per second were released in the counter tube. Such radiation intensities are, however, quite usual and occur both in the testing of materials without destroying them and in the medicinal dosimetry. It is true that the counter tubes respond at such high radiation intensities, but the indication of the counter tube is no longer proportional to the impinging radiation intensity. By experiment has been found, that the counter tube requires a certain "recuperation time" which lies in the value of about $10^{-4}$ seconds, in order to be again ready to respond after a counter tube impulse. High impulse frequencies are, however, particularly desired in order to counteract the static fluctuations in the counter tube effect in the case of very short measuring times. Consequently the quantitatively measurable maximum radiation intensity is considerably smaller than the radiation intensities which still can be measured with the known ionisation chambers. As, however, there is a considerable interval between the sensitive ionisation chamber and the counter it is necessary to increase the discharging capacity of the counter, so that quantitative measurements can be taken of large ray intensities even in the interval and the static fluctuation in the counter effect even in the case of short measuring times.

The present invention has for its object to increase the said releasing capacity of counter tubes with vapor addition. It is based on the following recognitions:

The releasing capacity of a counter tube is limited thereby that at each discharging a space charge jacket is formed around the counter wire and reduces the field strength in the discharging range until the discharge breaks. This space charging must be led away a sufficiently great distance before the counter tube can again respond. In order to reduce the time necessary therefor (recovering time), that is to increase the releasing capacity, the space charge formation must therefore be suppressed as much as possible.

This is attained, according to the invention, in that an operating voltage below the "initial voltage" is laid on the counter tube with vapor addition.

Concerning this the following must be remarked:

As the counter tube operates below the so-called "threshold voltage," the space charge formation is suppressed to a great extent. "Threshold voltage" means, as already mentioned, the operative voltage to be laid on the counter tube, at which the counter tube commences to operate in the manner hitherto usual, that is at which the individual impulses attain an appreciable value which can be read on the measuring instrument. The formation of the space charging is effected by the ionisator released by the primary elections near the counter wire, that is the wire electrode extending in axial direction in the interior of the counter tube. The number of the ions formed by one electron is, however, the smaller the less the kinetic energy of the electron is. The avalanche-like formation of ions causing the "counter tube impulse" takes place as is known, only at the "threshold voltage" characterized thereby. If, therefore, the work is carried out, according to the invention, below this threshold voltage, an electron only releases few ions which also lead to a slight space charging. By operating the counter tube according to the invention with a voltage below the "threshold voltage," one puts up intentionally with smaller values of counter tube impulses, which may be intensified as desired, and thereby it is attained that the counter tube does not fail anymore at high numbers of impulses but can be used successfully also at the measuring of very high radiation intensities.

By means of the invention is attained a releasing capacity of the counter tube, as has been confirmed by experiments, up to more than 100,000 impulses per second. This means, however, that now radiation intensities are measurable which are 100 times as strong as the intensities hitherto measurable with counter tubes with vapor addition. This is a fact which in view of the measurements in the testing of materials without destruction is of extreme importance.

An embodiment of the invention is illustrated by way of example in the accompanying drawing, in which—

Figure 1:
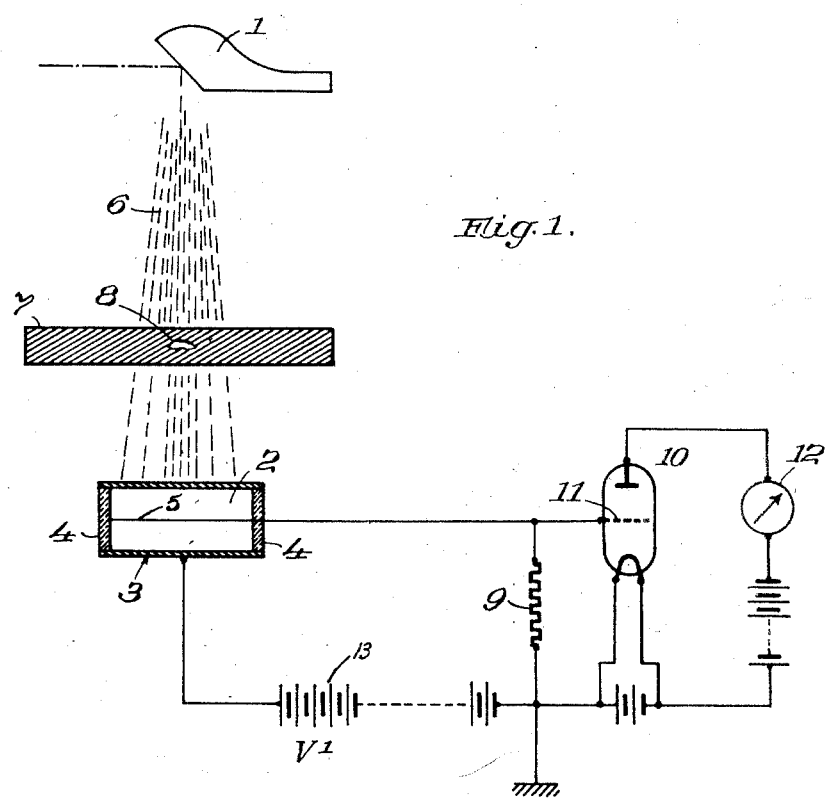

Fig. 1 is a diagram showing how the operative voltage which is below the threshold voltage is applied on the counter tube, Fig. 2 shows the operating curve of the counter tube, that is the dependency of the intensity of the counter tube impulses upon the voltage applied on the counter tube.

2 designates a counter tube with vapor addition, which consists substantially of a metal cylinder 3 forming one of the electrodes, the two insulating plugs air-tightly shutting off the interior of the counter tube and the counter wire 5 which forms the second electrode. The two electrodes of the counter tube are connected to the two poles of a high voltage battery 13 which gives to the counter tube a certain operative voltage $V_1$. The counter wire 5 is connected at the one end to the grid 11 of an amplifier tube 10 and at the other end through the intermediary of a resistance 9 to earth. An indicating instrument 12, connected up in the anode circuit of the amplifier aggregate, indicates the counter tube impulses amplified by means of the amplifier tube 10. In practice one amplifier step will not be sufficient, but several amplifier steps of the kind shown will be provided and the indicating instrument will then be arranged in the anode circuit of the last of these amplifier tubes. According to the invention the operative voltage $V_1$ laid on the counter tube is smaller than the so called "threshold voltage" of the corresponding counter tube. This counter tube is indicated in the curve of the Fig. 2 showing the "counter tube characteristic" of the corresponding counter tube so that the point of the "operating voltage" on the left portion of the curve, that is at the left of the point $V_2$, representing the "threshold voltage," is designated by $V_1$. The Röntgen-rays 6, emanating from the anode of a Röntgen-valve not shown, are directed upon the counter tube, and with the aid of these Röntgen rays a workpiece 7 has to be examined for defective points according to the well known through-radiation method. The workpiece 7, in the present instance a plate, is moved in the longitudinal direction of the counter tube along the same. As long as the plate has, at uniform thickness, no defective point in the interior, the radiation intensity, impinging on the counter tube during this shifting and which can pass through the plate, will not change and the number of counter tube impulses will remain constant. If, however, a portion of the plate having a hollow point 8 comes into the range of the rays, this will be perceivable in that the ray intensity passing through the plate increases, owing to the reduced absorption capacity of the plate, and therewith the number of impulses of the counter tube increases also.

I claim:

1. A method for measuring short wave radiations such as X-rays, gamma rays and the like, consisting in exposing a counter tube (Geiger-Müller counter) with vapour addition to the radiation, in feeding to said counter tube an operative voltage below the threshold voltage of said tube, and in feeding the counter tube current impulses released in the counter tube to a measuring circuit comprising an indicating instrument.

2. A method for measuring short wave radiations such as X-rays, gamma rays and the like, consisting in exposing a counter tube (Geiger-Müller counter) with vapour addition to the radiation, in feeding to said counter tube an operative voltage below the threshold voltage of said tube, and in feeding the counter tube current impulses released in the counter tube to an amplifier comprising an indicating instrument.

ADOLF TROST.